United States Patent [19]

Jiro

[11] Patent Number: 4,844,704
[45] Date of Patent: Jul. 4, 1989

[54] FUEL PUMP ASSEMBLY

[75] Inventor: Morita Jiro, Tokyo, Japan

[73] Assignee: Honda Giken Kogyo Kabushiki Kaisha, Tokyo, Japan

[21] Appl. No.: 239,002

[22] Filed: Aug. 29, 1988

Related U.S. Application Data

[63] Continuation of Ser. No. 34,861, Apr. 6, 1987, abandoned.

[30] Foreign Application Priority Data

Apr. 3, 1986 [JP] Japan ............... 61-50271[U]
Apr. 3, 1986 [JP] Japan ............... 61-50272[U]

[51] Int. Cl.$^4$ ............................................. F04B 39/16
[52] U.S. Cl. .................................... 417/307; 123/509;
123/516; 137/587; 417/423.3; 417/435; 417/313
[58] Field of Search ........... 417/313, 360, 366, 423 B, 417/435, 307; 137/587, 197; 123/509, 519.4, 516; 210/416.4; 220/85 VR, 85 VS

[56] References Cited

U.S. PATENT DOCUMENTS

| | | | |
|---|---|---|---|
| 2,261,915 | 11/1941 | Korte et al. | 417/423 B |
| 2,312,526 | 3/1943 | Curtis | 417/423 B |
| 2,369,440 | 2/1945 | Curtis | 417/423 B |
| 2,790,392 | 4/1957 | Schweiss | 417/435 X |
| 2,937,755 | 5/1960 | Szwargulski | 210/416.4 X |
| 3,000,321 | 9/1961 | Parker | 417/360 X |
| 3,443,519 | 5/1969 | White | 417/366 |
| 3,507,582 | 4/1970 | Jeep, Jr. et al. | 417/366 |
| 4,231,719 | 11/1980 | Ringwald et al. | 417/366 |
| 4,309,155 | 1/1982 | Heinz et al. | 417/435 X |
| 4,410,302 | 10/1983 | Chiba et al. | 417/307 X |
| 4,569,637 | 2/1986 | Tuckey | 417/435 X |
| 4,591,319 | 5/1987 | Takahashi et al. | 417/360 |
| 4,651,701 | 3/1987 | Weaver | 123/509 |
| 4,672,937 | 6/1987 | Fales et al. | 123/516 X |
| 4,684,463 | 8/1987 | Mizusawa | 210/416.4 X |
| 4,694,857 | 9/1987 | Harris | 417/360 |

FOREIGN PATENT DOCUMENTS 3514594 10/1986 Fed. Rep. of Germany ...... 417/313

Primary Examiner—Leonard E. Smith
Attorney, Agent, or Firm—Lyon & Lyon

[57] ABSTRACT

Fuel supply systems incorporating fuel pump assemblies having vents leading from upper portions of filter cases to vapor phase portions of a fuel tank. In one embodiment, a fuel pump is located wholly within a filter case with a relief port also provided within the case. Location of the components and baffles as well as a vapor vent promote flow of entrained vapor in the fuel away from the pump intake. Further, with the present arrangement, vapor is less likely to be formed.

13 Claims, 2 Drawing Sheets

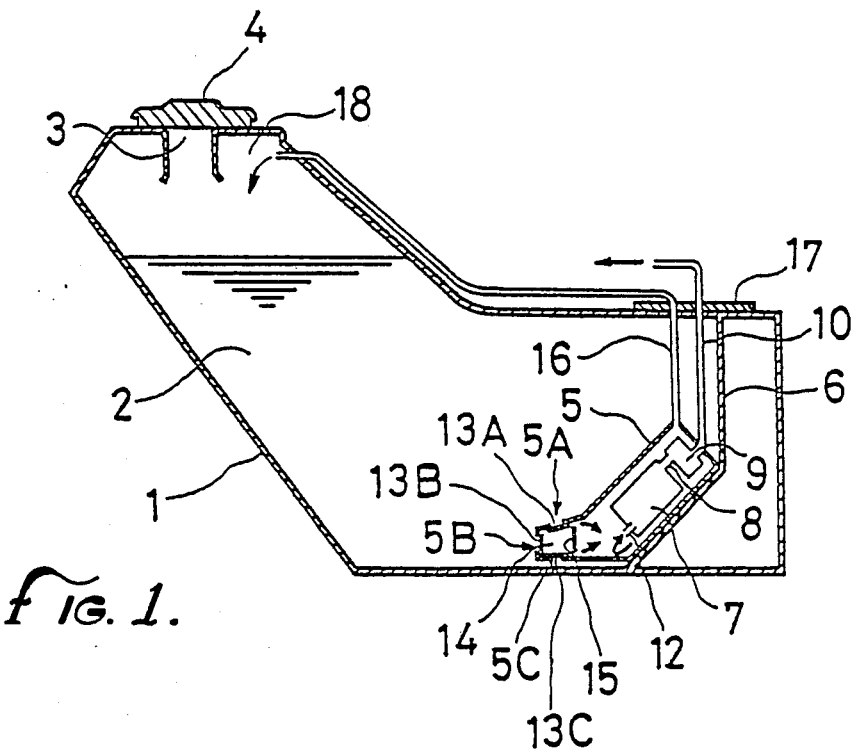
*fig. 1.*
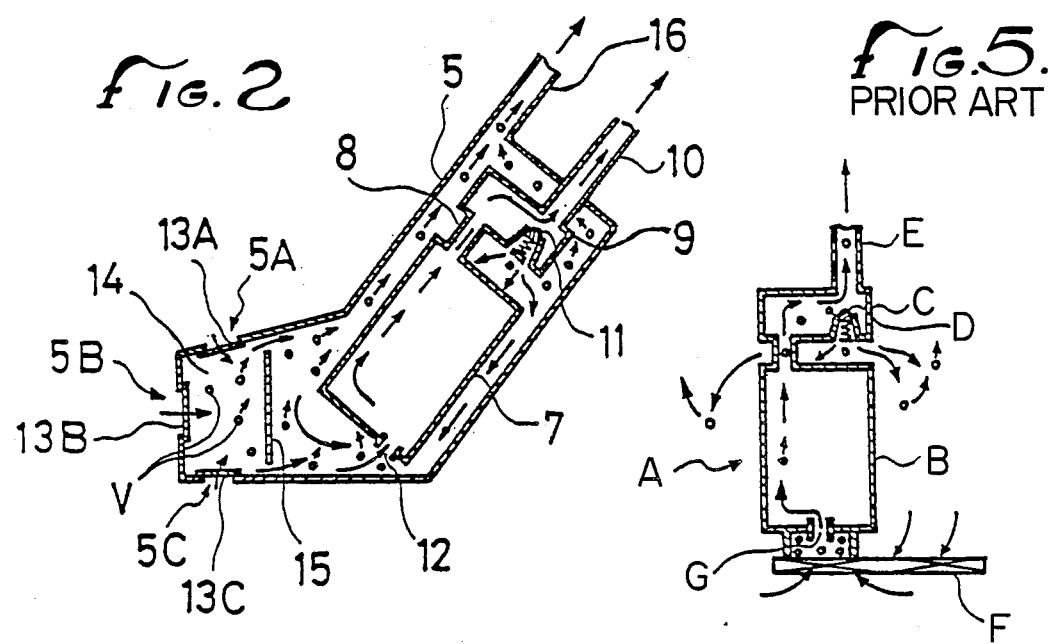
*fig. 2.*
*fig. 5.*
PRIOR ART

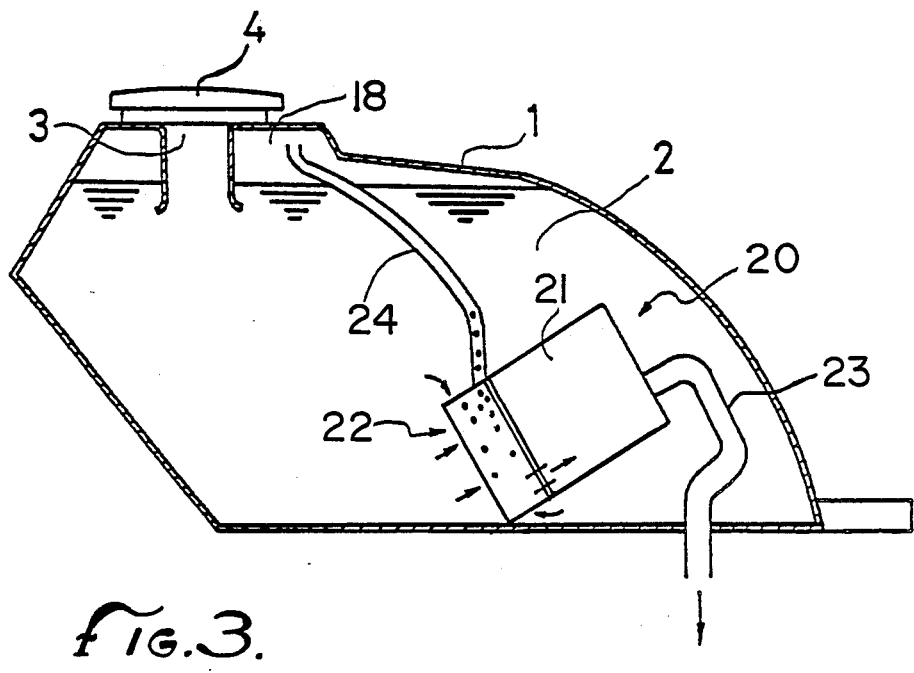
fig.3.
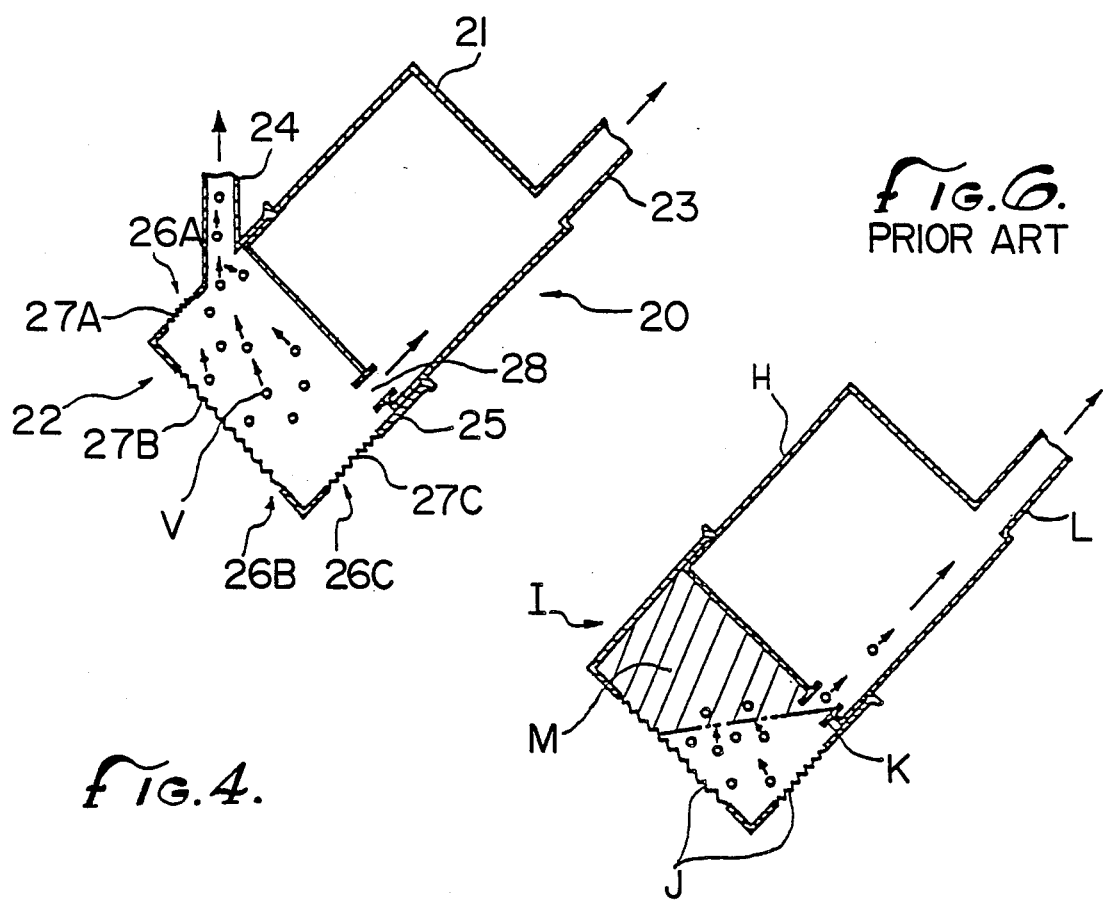
fig.6. PRIOR ART
fig.4.

FUEL PUMP ASSEMBLY

This application is a continuation of application Ser. No. 034,861, filed Apr. 6, 1987, now abandoned.

BACKGROUND OF THE INVENTION

The field of the present invention is fuel pump assemblies and arrangements for fuel supply systems.

Fuel pump systems have long been known which incorporate a fuel pump located in the fuel tank of a vehicle. FIG. 5 illustrates one such device. The fuel pump, generally designated A, includes a pump body B and a pressure regulating chamber C. The pressure regulating chamber C is at the output side of the pump and is provided with a relief valve D. The relief valve D is spring biased to maintain a relatively constant fuel pressure in the regulating chamber C. The fuel pressurized by the pump B and maintained in the regulating chamber C at no more than a maximum selected pressure is delivered to a fuel pipe E which is in communciation with a carburetor or the like.

At the inlet side of the pump body B, a filter F is provided. The filter F may have a large surface area to reduce the pressure differential thereacross. The pump A may thus draw fuel from the surrounding tank through the filter F for pressurized discharge through the fuel pipe E. When fuel demand is low, fuel may pass through the relief valve D and back into the tank where it may later be drawn again through the filter F. When fuel demand is heavy, all or substantially all of the flow from the pump will pass through the fuel pipe E.

Fuels, such as gasoline, tend to easily generate vapor when the fuel temperature is elevated. In vehicles, temperature increases are experienced due to high atmospheric temperatures and radiant heat from the engine. This vapor can form bubbles in fuel system components under certain conditions. When such bubbles are present in a fuel passage, a phenomenon known as vapor lock can occur resulting in reduced or nonperformance of the system.

In fuel pumps located within the fuel tank, under conditions where vapor is easily formed, such vapor typically generated at or behind the filter, due to the differential pressure across the filter created by the resistance to flow of the fuel through the filter. Under conditions of elevated temperatures and where the filter F cannot be large enough or has been made more resistant to flow, vapor may be generated near the inlet portion G of the pump body B. Some of the vapor may be discharged through the relief valve D to harmlessly rise to the vapor phase portion of the tank. However, other vapor may be entrained in the flow through the fuel pipe E to the carburetor. The fuel through the relief valve D simply joins the remainder of the fuel in the tank such that 100% of the flow of fuel through the pump body B must pass anew through the filter F.

Another known device is illustrated in FIG. 6. In this arrangement, the pump H is also of the type contained within a fuel tank. The pump is provided with a filter portion, generally designated I, located at the intake side of the pump H. Fuel is filtered at the filter portion I through filter members J where it is then drawn into an intake port K of the pump H. The fuel is then pressurized and delivered through an exhaust port L to a carburetor or the like.

Within the filter portion I when adverse conditions exist, vapor may be generated because of the pressure differential across the filter. This generated vapor is easily drawn into the pump where it may interfere with performance of the fuel supply system. The vapor generated may find areas in the filter portion I where it may collect. Such a storage area is represented by the hatched portion M. Such vapor may accumulate under adverse conditions and eventually be drawn into the intake port K.

SUMMARY OF THE INVENTION

The present invention is directed to an improved fuel supply system for a vehicle which accommodates vapor present between the filter and the pump intake of a fuel pump assembly. To this end, a vent is provided which releases vapor accurring between the fuel filter and the fuel pump inlet to a vapor phase portion of the associated fuel tank.

In a first aspect of the present invention, a cavity may be provided at an elevated position in the filter portion of the fuel pump assembly with a vent directed from that cavity to a vapor phase portion at the upper end of the associated fuel tank.

In another aspect of the present invention, the fuel pump assembly may be wholly contained within a filter case. A relief valve associated with a pressure regulating chamber on the pump may discharge into the filter case. A vent may again be provided at an upper portion of the case. Thus, accumulated vapor may be accommodated. Further, fuel already drawn through the filter and then released through the relief port is not required to be drawn through the filter again.

Accordingly, it is an object of the present invention to provide an improved fuel supply system to better accommodate and avoid fuel vapor in the fuel pump assembly. Other and further objects and advantages will appear hereinafter.

BRIEF DESCRIPTION OF THE DRAWINGS

FIG. 1 is a cross-sectional elevation of a system of the present invention in association with a fuel tank.

FIG. 2 is a cross-sectional elevation of the system of FIG. 1.

FIG. 3 is a cross-sectional elevation of a second embodiment of the present invention also illustrated in a fuel tank.

FIG. 4 is a cross-sectional elevation of the fuel pump assembly of FIG. 3.

FIG. 5 is a prior art fuel pump illustrated in cross sectional elevation.

FIG. 6 is a second prior art fuel pump illustrated in cross-sectional elevation.

DETAILED DESCRIPTION OF THE PREFERRED EMBODIMENTS

Turning in detail to the drawings, FIGS. 1 and 2 illustrate a first embodiment of the present invention. A fuel tank 1 is illustrated as including a cavity 2 for the storage of fuel, such as gasoline. A filler port 3, closed by a cap 4 provides access for the introduction of fuel into the tank. At a lower portion of the fuel tank 1 a filter case 5 is arranged and held in place by a bracket 6, which is in turn, fixed in the tank 1. Within the case 5 a fuel pump, indicated generally by the fuel body 7 is wholly contained. The case and the pump body are shown to be inclinedly oriented. The fuel pump 7 contemplated for use with this invention is one of many well known electro-magnetic pumps actuated by battery or generator sources in the vehicle.

The fuel pump body 7 includes a passage 8 from the discharge side of the pump portion which directs pressurized fuel to a pressure regulating chamber 9. The pressure regulating chamber 9 is in turn coupled at the outlet thereof to a fuel pipe 10. Within the pressure regulating chamber 9 there is a relief port 11. By means of the relief port 11, which may include a spring biased valve, a selected maximum fuel pressure may be provided. In the event that fuel demand is low and pressure builds within the regulating chamber 9, fuel will be discharged from the relief valve 11 to insure that pressure does not exceed the selected maximum at the carburetor.

The fuel pump 7 includes an intake port 12 adjacent the bottom of the filter case 5. Near the intake port 12 are inlets 5A, 5B and 5C penetrating the filter case 5 and arranged with mesh type filters member 13A, 13B and 13C, respectively. The filter members 13A, 13B and 13C are fixed at the respective inlets with that portion of the filter case 5 containing the inlets being designated, the filter portion 14. Located between the inlet 5A, 5B and 5C and the intake port 12 to the pump body 7 is a partition 15. The partition 15 forms a baffle with flow being possible around the baffle as shown by arrows in FIG. 2. The baffle 15 interrupts any direct flow which may occur between the inlets and the pump intake opening 12. This reduces local flow velocity and allows entrained vapor to migrate upwardly away from the intake opening. Thus, vapor is less likely to be sucked directly from the filter portion 14 into the intake port 12.

Located at an upper portion of the filter case 5 is a vent 16. The vent 16 extends to a supporting plate 17 and then returns to a vapor phase portion 18 of the tank 1. The vapor phase portion 18 occupies the space to be above the normal fuel level in the tank.

In operation, the fuel pump is energized when the vehicle is running such that fuel in the fuel tank 1 is sucked through the filter portion 14 of the filter case 5. In drawing fuel through the filter portion 14, under certain circumstances vapor V may be generated. This vapor V flows together with the fuel toward the intake side of the pump 7. In flowing around the baffle 15, a substantial amount of the vapor migrates upwardly for discharge through the vent 16 to the vapor phase portion 18 of the tank 1. A small amount of vapor migrate it to the intake port 12 to be passed to of this the pressure regulating chamber 9. Some vapor may be released at this time through the relief port 11 where again it may rise to be passed from the vent 16.

The fuel discharged from the relief port 11 is by the reversely directed arrow in FIG. 2 to be discharged within the filter case 5 in such manner it is not required to pass through the filter again before being drawn into the intake port 12 of the fuel pump 7. Thus, all of the fuel drawn into the intake port 12 need not have just passed through the filter portion 14. Some of the flow may be provided from th discharge from the relief port 11. Thus, the total volume of filtering is reduced. By reducing the demand on the filter, less pressure differential exists across the filter and less vapor is accordingly generated.

In this first embodiment of the invention, a provision is made for vapor removal by the vent 16. Fluid flow is directed by means of the relative elevation of the various components within the filter case 5 and by means of the baffle 15 such that vapor has an opportunity to flow upwardly toward the vent 16 and be separated from the fuel drawn into the intake port 12 of the fuel pump 7. Additionally, relief flow from port 11 is recirculated without requiring refiltering to reduce the generation of vapor in the first place.

Turning to the embodiment of FIGS. 3 and 4, a fuel tank is again illustrated with similar reference characters denoting similar elements to those of the first embodiment. A fuel pump, generally designated 20, is illustrated as being positioned on a slant at the bottom of the tank 1. The fuel pump 20 is integrally contained within the pump body 21 and includes a filter portion, generally designated 22. the fuel pump 20, again, employs any one of a number of commonly available electro-magnetic pumps. The filter portion 22 is mounted on the intake side of the pump body 21. The exhaust side of the pump body 21 is connected to a fuel pipe 23 which is in turn connected to a carburetor or the like by piping outside of the tank 1.

At an upper portion of the filter portion 22, a vapor vent 24 is arranged to draw off accumulated vapor. The vent 24 extends to an upper vapor phase portion 18 of the tank 1. Thus vapor V accumulated within the filter portion 22 has an opportunity to flow away from the pump.

Located in the walls 25 of the filter portion 22 are inlets 26A, 26B and 26C having mesh type filter members 27A, 27B and 27C, respectively. These inlets 26 are provided such that minimum pressure is required to draw fuel therethrough and into the pump intake port 28.

By providing the intake port 28 at a low position relative to the filter portion 22 and the vent 24 at the upper end of the filter portion 22, vapor to the pump 20 is reduced to improve the efficiency thereof.

Accordingly, improved fuel pump assemblies are disclosed in association with fuel supply systems which better accommodate vapor removal without inhibiting the performance of the fuel pump. While embodiments and applications of this invention have been shown and described, it would be apparent to those skilled in the art that many more modifications are possible without departing from the inventive concepts herein. The invention, therefor is not to be restricted except in the spirit of the appended claims.

What is claimed is:

1. A vehicular fuel supply comprising:
   a fuel tank having a vapor phase portion at an upper end thereof;
   a case having an inlet covered by a filter and a vent, said vent being higher than said inlet and in communication with the vapor phase portion of said tank, said inlet being in communication with the bottom portion of said tank, said case being disposed in the rear of said tank to extend rearwardly therein;
   an elongated tube having one end penetrating said fuel tank to communicate at one end with said case vent and at other end with the vapor phase portion of the tank; and
   a fuel pump within said case, said fuel pump having an intake port within said case and an outlet extending from said case.

2. A fuel pump assembly for a vehicular fuel supply system including a fuel tank having a vapor phase portion at an upper end of the tank, comprising:
   a case disposed in the rear of said tank to extend rearwardly therein and having an inlet covered by a filter in the lower portion of said case and a vent at the top thereof, said inlet being in communication with a bottom portion of the tank;

an elongated tube communicating at one end with said case vent and at its other end with the vapor phase portion of the tank; and a fuel pump positioned within said case and having an intake port in said case adjacent the bottom of said case and an outlet extending from said case, said fuel pump including a pressure regulating chamber, said chamber having a relief port therefrom in communication with the interior of said case.

3. A fuel pump assembly for a vehicular fuel supply system including a fuel tank having a vapor phase portion at an upper end of the tank, comprising:

a case having an inlet covered by a filter and a vent, said case disposed in the longitudinal rear of said fuel tank with the longitudinal axis of said case extending rearwardly in said fuel tank, said inlet being in communication with a bottom portion of said fuel tank, and said vent being higher than said inlet;

an elongated tube communicating at one end with said case vent and at its other end with the vapor phase portion of the tank; and a fuel pump positioned wholly within said case and having an intake port within said case, an outlet extending from said case, and a pressure regulating chamber, said chamber having a relief port therefrom in communication with the interior of said case, said case having a baffle between said inlet and said intake port.

4. The fuel pump assembly of claim 3 wherein said inlet is in a lower portion of said case, said intake port being adjacent the bottom of said case and said vent being at the top of said case.

5. A fuel pump assembly for a vehicular fuel supply system including a fuel tank adapted to contain a liquid phase portion therein and having a vapor phase portion at an upper end of said tank, comprising:

a case disposed in said fuel tank, said case having an inlet communicating with said liquid phase portion of said fuel tank and a vent communicating with the vapor phase portion thereof, said vent communicating with said case at a position higher than said inlet, a fuel pump disposed within said case and enclosed thereby, said fuel pump having an intake port for reception of liquid from said casing inlet and an outlet communicating with a fuel pipe for delivery of fuel exteriorly of said fuel tank, and a pressure regulating chamber connecting between said fuel pump outlet and said fuel pipe, said chamber having a relief port therefrom in communication with the interior of said case.

6. The fuel pump assembly of claim 5 including a filter means covering said case inlet.

7. The fuel pump assembly of claim 6 including a baffle in said case between said inlet and said pump intake port.

8. The fuel pump assembly of claim 7 in which said case is disposed in an upwardly inclined disposition and said vent communicates with said case at substantially the uppermost portion thereof.

9. The fuel pump assembly of claim 8 in which said pressure regulating chamber is disposed within said case.

10. The fuel pump assembly of claim 9 in which said pump and said pressure regulating chamber are disposed in substantial alignment on an axis substantially parallel with that of said case.

11. The fuel pump assembly of claim 10 in which said case inlet communicates with a lower portion of said fuel tank.

12. The fuel pump assembly of claim 5 in which said case is positioned in the longitudinal rear portion of said fuel tank.

13. The fuel pump assembly of claim 7 in which said pressure regulating relief port communicates with the interior of said case downstream of said baffle.

* * * * *

UNITED STATES PATENT AND TRADEMARK OFFICE
CERTIFICATE OF CORRECTION

PATENT NO. : 4,844,704
DATED : July 4, 1989
INVENTOR(S) : MORITA, JIRO

It is certified that error appears in the above-identified patent and that said Letters Patent is hereby corrected as shown below:

In the heading of the patent, the inventor's name should read -- MORITA --.

In the caption of the patent, after "[75] Inventor:" delete "Morita Jiro" and insert -- Jiro Morita -- therefor.

Signed and Sealed this

Twelfth Day of February, 1991

*Attest:*

HARRY F. MANBECK, JR.

*Attesting Officer*     *Commissioner of Patents and Trademarks*